US009118755B2

(12) United States Patent
Griffith et al.

(10) Patent No.: US 9,118,755 B2
(45) Date of Patent: *Aug. 25, 2015

(54) PORTABLE RADIOTELEPHONE FOR AUTOMATICALLY DIALING A CENTRAL VOICE-ACTIVATED DIALING SYSTEM

(71) Applicant: AT&T Intellectual Property I, L.P., Atlanta, GA (US)

(72) Inventors: Gregory Clyde Griffith, Lawrenceville, GA (US); Benjamin F. Holcomb, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/634,191

(22) Filed: Feb. 27, 2015

(65) Prior Publication Data
US 2015/0172458 A1    Jun. 18, 2015

Related U.S. Application Data

(63) Continuation of application No. 14/299,461, filed on Jun. 9, 2014, now Pat. No. 9,008,729, which is a continuation of application No. 13/090,035, filed on Apr. 19, 2011, now Pat. No. 8,750,935, which is a
(Continued)

(51) Int. Cl.
*H04M 1/00* (2006.01)
*H04B 7/00* (2006.01)
(Continued)

(52) U.S. Cl.
CPC ............ *H04M 3/42204* (2013.01); *H04W 4/16* (2013.01)

(58) Field of Classification Search
CPC ................................................. H04M 1/274575
USPC ..................... 455/564, 575.1, 575.4
See application file for complete search history.

(56) References Cited

U.S. PATENT DOCUMENTS

| 4,845,772 A | 7/1989 | Metroka et al. |
| 4,945,570 A | 7/1990 | Gerson et al. |

(Continued)

FOREIGN PATENT DOCUMENTS

| DE | 19627487 | 2/1997 |
| EP | 0554625 | 8/1993 |

(Continued)

OTHER PUBLICATIONS

Official Gazette; Jan. 24, 1995; Patent No. 5,384,825; "Method for Memory Dialing for Cellular Telephones," filed on Jul. 1, 1993; Serial No. 86,413.
(Continued)

*Primary Examiner* — Tilahun B Gesesse
(74) *Attorney, Agent, or Firm* — Hartman & Citrin LLC (57) ABSTRACT

A portable radiotelephone can be shifted between a first condition wherein the radiotelephone does not receive or transmit voice communications by radiotelephone transmissions over radiotelephone channels and a second condition wherein the radiotelephone receives and transmits voice communications by radiotelephone transmissions over radiotelephone channels. The radiotelephone automatically calls a central voice-activated phone dialing system remote from the portable radiotelephone in response to producing the second condition in the radiotelephone. The radiotelephone includes a switch for producing the first and second conditions.

20 Claims, 4 Drawing Sheets

Related U.S. Application Data continuation of application No. 12/581,798, filed on Oct. 19, 2009, now Pat. No. 7,953,449, which is a continuation of application No. 11/355,595, filed on Feb. 16, 2006, now Pat. No. 7,613,483, which is a continuation of application No. 09/547,449, filed on Apr. 12, 2000, now Pat. No. 7,010,327, which is a continuation of application No. 08/792,246, filed on Jan. 31, 1997, now Pat. No. 6,128,514.

(51) Int. Cl.
*H04M 3/42* (2006.01)
*H04W 4/16* (2009.01)

(56) References Cited

U.S. PATENT DOCUMENTS

| | | | |
|---|---|---|---|
| 5,042,063 A | | 8/1991 | Sakanishi et al. |
| 5,054,051 A | * | 10/1991 | Hoff ........................ 455/556.1 |
| 5,095,503 A | | 3/1992 | Kowalski |
| 5,148,471 A | | 9/1992 | Metroka et al. |
| 5,151,946 A | | 9/1992 | Martensson |
| 5,175,759 A | * | 12/1992 | Metroka et al. ............ 455/569.1 |
| 5,339,352 A | | 8/1994 | Armstrong et al. |
| 5,365,570 A | * | 11/1994 | Boubelik ...................... 455/565 |
| 5,452,340 A | | 9/1995 | Engelbeck et al. |
| 5,465,401 A | | 11/1995 | Thompson |
| 5,493,604 A | * | 2/1996 | Hirayama ...................... 455/564 |
| 5,535,439 A | | 7/1996 | Katz |
| 5,542,100 A | * | 7/1996 | Hatakeyama .............. 455/404.2 |
| 5,574,772 A | * | 11/1996 | Scalisi et al. ................... 455/565 |
| 5,706,332 A | | 1/1998 | Nagai |
| 5,742,666 A | | 4/1998 | Alpert |
| 5,797,092 A | | 8/1998 | Cox et al. |
| 5,802,149 A | | 9/1998 | Hanson |
| 5,894,591 A | * | 4/1999 | Tamayo ........................ 340/7.5 |
| 5,960,357 A | | 9/1999 | Kim |
| 5,963,875 A | | 10/1999 | Go |
| 6,073,027 A | * | 6/2000 | Norman et al. ............ 455/575.4 |
| 6,144,723 A | | 11/2000 | Truchon et al. |
| 6,167,251 A | | 12/2000 | Segal et al. |
| 6,198,947 B1 | | 3/2001 | Barber |
| 6,339,706 B1 | | 1/2002 | Tillgren et al. |
| 6,349,212 B1 | * | 2/2002 | Martensson et al. .......... 455/462 |
| 6,792,291 B1 | | 9/2004 | Topol et al. |
| 7,050,973 B2 | | 5/2006 | Aronowitz |
| 2003/0083882 A1 | | 5/2003 | Schemers, III et al. |
| 2003/0200087 A1 | | 10/2003 | Aronowitz |
| 2006/0235684 A1 | | 10/2006 | Chang |

FOREIGN PATENT DOCUMENTS

| | | |
|---|---|---|
| FR | 2725099 | 3/1996 |
| WO | WO 98/34389 | 8/1998 |

OTHER PUBLICATIONS

Official Gazette; Sep. 21, 1993; Patent No. 5,247,565; "Cellular Telephone with Keypad Controller," filed on Oct. 21, 1991; Serial No. 779,787.
U.S. Office Action dated Aug. 19, 2010 in U.S. Appl. No. 12/581,798.
U.S. Notice of Allowance dated Jan. 31, 2011 in U.S. Appl. No. 12/581,798.
U.S. Office Action dated Dec. 12, 2006 in U.S. Appl. No. 11/355,595.
U.S. Office Action dated May 24, 2007 in U.S. Appl. No. 11/355,595.
U.S. Office Action dated Jan. 2, 2008 in U.S. Appl. No. 11/355,595.
U.S. Office Action dated Jul. 2, 2008 in U.S. Appl. No. 11/355,595.
U.S. Notice of Allowance dated Jul. 1, 2009 in U.S. Appl. No. 11/355,595.
U.S. Office Action dated Dec. 20, 2002 in U.S. Appl. No. 09/547,449.
U.S. Office Action dated Jul. 17, 2003 in U.S. Appl. No. 09/547,449.
U.S. Office Action dated Jan. 12, 2004 in U.S. Appl. No. 09/547,449.
U.S. Office Action dated Jul. 19, 2004 in U.S. Appl. No. 09/547,449.
U.S. Office Action dated Apr. 8, 2005 in U.S. Appl. No. 09/547,449.
U.S. Notice of Allowance dated Sep. 22, 2005 in U.S. Appl. No. 09/547,449.
International Search Report dated Jun. 9, 1998 in International Application No. PCT/US1998/000886.
U.S. Office Action dated Sep. 20, 2012 in U.S. Appl. No. 13/090,035.
U.S. Office Action dated Sep. 4, 2013 in U.S. Appl. No. 13/090,035.
U.S. Notice of Allowance dated Jan. 8, 2014 in U.S. Appl. No. 13/090,035.
U.S. Office Action dated Oct. 2, 2014 in U.S. Appl. No. 14/299,461.
U.S. Notice of Allowance dated Nov. 24, 2014 in U.S. Appl. No. 14/299,461.

* cited by examiner

PORTABLE RADIOTELEPHONE FOR AUTOMATICALLY DIALING A CENTRAL VOICE-ACTIVATED DIALING SYSTEM

CROSS REFERENCE TO RELATED APPLICATIONS

This application is a continuation of U.S. patent application Ser. No. 14/299,461, filed Jun. 9, 2014, now U.S. Pat. No. 9,008,729 issued on Apr. 14, 2015; which is a continuation of U.S. patent application Ser. No. 13/090,035, filed Apr. 19, 2011, now U.S. Pat. No. 8,750,935 issued on Jun. 10, 2014; which is a continuation of U.S. patent application Ser. No. 12/581,798, filed Oct. 19, 2009, now U.S. Pat. No. 7,953,449 issued on May 31, 2011; which is a continuation of U.S. patent application Ser. No. 11/355,595, filed Feb. 16, 2006, now U.S. Pat. No. 7,613,483 issued on Nov. 3, 2009; which is a continuation of U.S. patent application Ser. No. 09/547,449, filed Apr. 12, 2000, now U.S. Pat. No. 7,010,327 issued on Mar. 7, 2006; which is a continuation of U.S. patent application Ser. No. 08/792,246, filed Jan. 31, 1997, now U.S. Pat. No. 6,128,514 issued on Oct. 3, 2000; all of which are incorporated by reference herein in their entireties.

TECHNICAL FIELD

This invention generally relates to portable radiotelephones, and more particularly to a cellular portable radiotelephone for use with a remote central voice-activated dialing system.

BACKGROUND OF INVENTION

Portable radiotelephones are well known and commonly used, particularly in the form of portable cellular telephones. Cellular telephones are very convenient for users because they are cordless and can be made in various small sizes to fit in pockets and purses. In addition, some cellular telephones permit the user to answer and terminate telephone calls and control other telephone functions by opening or closing a movable element, such as a cover. Although cellular telephones are very convenient, there remains a need for cellular telephones which are easier to use and carry.

SUMMARY OF THE INVENTION

This invention fulfills the above-described need by providing a portable radiotelephone that automatically calls a central voice-activated phone dialing system remote from the portable telephone in response to producing a condition in the portable radiotelephone wherein the radiotelephone receives and transmits voice communications by radiotelephone transmissions over radiotelephone channels. Because the telephone automatically connects to a remote central voice-activated dialing system, there is no need for a keypad, and the telephone can be made very small and compact and is very simple to use. To make a phone call, the user simply turns the phone on, and when the connection to the voice-activated dialing system is made, the user recites the number to be dialed and the call is made. The call is terminated when the phone is powered down by shifting the phone to a condition wherein the radiotelephone does not receive or transmit voice communications by radiotelephone transmissions over radiotelephone channels.

More particularly, the portable radiotelephone of the present invention includes a housing, a device connected to the housing for selectively producing a first condition in the portable radiotelephone and, alternatively, producing a second condition in the portable radiotelephone. The first condition of the radiotelephone is a state wherein the radiotelephone does not receive or transmit voice communications by radiotelephone transmissions over radiotelephone channels, and the second condition is a state wherein the radiotelephone receives and transmits voice communications by radiotelephone transmissions over radiotelephone channels. The radiotelephone also includes a device disposed in the housing for automatically calling a central voice-activated phone dialing system remote from the portable radiotelephone, in response to producing the second condition in the portable radiotelephone. The automatic calling device includes a dedicated memory location having stored therein a telephone number for the central voice-activated dialing system.

Still more particularly, the device for producing the first and second conditions in the portable radiotelephone includes a switch coupled to the microprocessor which controls telephone functions. In addition, a device for producing the first and second conditions further includes a cover which forms part of the housing and is movable relative to a base portion of the housing between a first position, wherein the portable radiotelephone is in the first condition, and a second position, wherein the portable radiotelephone is in the second condition. The cover can be attached to the base portion of the housing with a hinge so that the cover is rotatable about the hinge between the first position and the second position. Alternatively, the cover can be slidably attached to the base portion of the housing so that the cover is reciprocable relative to the housing base between the first position and the second position.

According to another aspect of the present invention, a method for initiating a radiotelephone call is provided comprising the steps of shifting a radiotelephone from a first condition, wherein the radiotelephone does not receive or transmit voice communications by radiotelephone transmissions over radiotelephone channels, to a second condition, wherein the radiotelephone receives and transmits voice communications by radiotelephone transmissions over radiotelephone channels, and automatically calling a central voice-activated phone dialing system remote from the portable radiotelephone in response to producing the second condition in the portable radiotelephone.

According to a particular embodiment of the present invention, a portable radiotelephone is provided consisting of a housing, a device connected to the housing for communicating voice communications as radiotelephone transmissions on radiotelephone channels, and a device connected to the housing for automatically dialing an electronically stored telephone number in response to an operator command. Desirably, the device for automatically dialing is programmed to dial a central voice-activated phone dialing system remote from the portable radiotelephone. The housing can include an electronic display and a cover, but does not include a keypad. Accordingly, this embodiment can be made to be very compact and slender for convenient portability and use. Alternatively, the telephone can further consist of a plurality of devices for automatically dialing an electronically stored telephone number in response to an operator command. Desirably, at least one of the automatic dialing devices is programmed to dial a central voice-activated phone dialing system remote from the portable radiotelephone.

According to yet another embodiment of the present invention, a portable radiotelephone is provided comprising a housing, a device connected to the housing for communicating voice communications as radiotelephone transmissions on radiotelephone channels, and a user interface connected to the housing and consisting of a device for automatically dialing an electronically stored telephone number in response to an operator command. Desirably, the device for automatically dialing is programmed to dial a central voice-activated phone dialing system remote from a portable radiotelephone. The radiotelephone can further consist of a plurality of devices for automatically dialing an electronically stored telephone number in response to an operator command. It is desirable that at least one of the devices for automatically dialing be programmed to dial a central voice-activated phone dialing system remote from the portable radiotelephone.

Therefore, an object of the present invention is to provide a portable radiotelephone which is small, compact, and easy to use.

Another object of the present invention is to provide a portable radiotelephone which takes advantage of the availability of central voice-activated dialing systems.

Other objects, features, and advantages of the present invention will become apparent from the following detail description, drawings, and claims.

DETAILED DESCRIPTION OF DRAWINGS

As summarized above, the present invention encompasses a portable radiotelephone for automatically calling a central voice-activated phone dialing system remote from the portable radiotelephone. Several embodiments of this invention are described in detail below.

Figure 1:
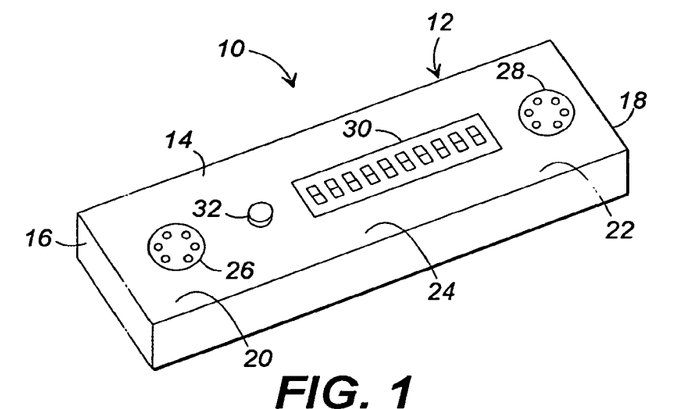
FIG. 1 is a perspective view of a portable cellular telephone made according to an embodiment of the present invention.

A first portable cellular telephone 10 made according to an embodiment of the present invention is illustrated in FIG. 1. The cellular telephone 10 shown in FIG. 1 is a relatively small, compact cellular telephone with limited features. This telephone 10 is designed exclusively for automatic dialing, and particularly for automatically dialing a central voice-activated dialing system. Generally described, the cellular telephone 10 comprises a housing 12 including a user interface console 14. As described in more detail below, the portable cellular telephone 10 consists of (includes only) the housing 12, a device connected to the housing for communicating voice communications as radiotelephone transmissions on radiotelephone channels, and a system connected to the housing for automatically dialing an electronically stored telephone number in response to an operator command. Desirably, this electronically stored telephone number is a telephone number for a central voice-activated dialing system and is stored in a dedicated memory location.

The housing 12 is desirably made of injection-molded plastic and has a length extending along a longitudinal axis from a bottom end 16 to a top end 18. The housing 12 includes a mouthpiece portion 20 at the bottom end 16 and an earpiece portion 22 at the top end 18. The housing 12 has a central portion 24 between the mouthpiece portion 20 and the earpiece portion 22. The housing 12 also includes a mouthpiece 26 in the user interface console 14 at the mouthpiece portion 20 of the housing and an earpiece 28 in the user interface console at the earpiece portion 22 of the housing. The housing 12 also includes a lighted display 30 for indicating the telephone number being called or dialed, off and on status, and roam or home status. A display, such as the display 30, is typical for cellular telephones, and the display's structure and operation are well known to those skilled in the art.

The portable cellular telephone 10 further comprises a turbo dial button or switch 32 for automatically dialing the electronically stored telephone number. Turbo dial features are well known to those skilled in the art, and the turbo dial button 32 of the portable cellular telephone 10 operates with an electronic package stored in the housing 12 to automatically dial the electronically stored telephone number and initiate voice communication by radiotelephone transmission on radiotelephone channels.

More particularly, the turbodial button 32, in conjunction with the electronic package, is operable when pressed to selectively produce a first condition in the portable cellular telephone 10 and, alternatively, produce a second condition in the portable cellular telephone. The first condition of the cellular telephone 10 is a state wherein the cellular telephone 10 does not receive or transmit voice communications by radiotelephone transmissions over radiotelephone channels, and the second condition is a state wherein the cellular telephone receives and transmits voice communications by radiotelephone transmissions over radiotelephone channels. In other words, the cellular telephone 10 does not answer or make calls when in the first condition and does answer and make calls when in the second condition. The cellular telephone 10 automatically calls the central voice-activated phone dialing system, which is remote from the portable cellular telephone, in response to producing the second condition in the portable cellular telephone. The cellular telephone 10 is powered down when in the first position and automatically powers up when in the second condition.

Figure 2:
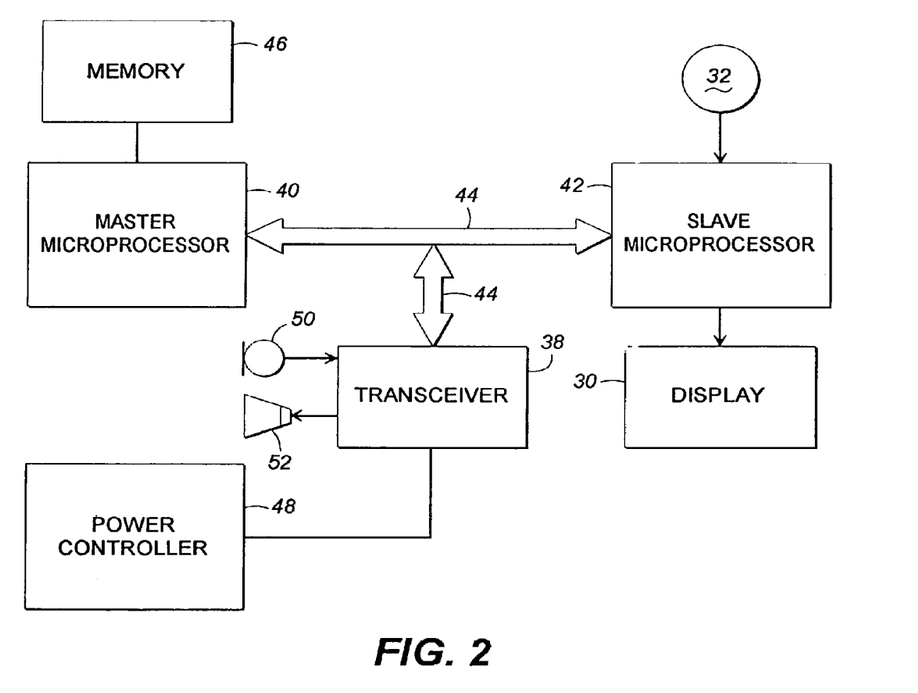
FIG. 2 is a block diagram of the electronic package of the telephone shown in FIG. 1.

The electronic components of cellular telephone 10 are conventional and a suitable electronics package is illustrated in FIG. 2. This electronics package generally comprises a transceiver 38, a master microprocessor 40, and a slave microprocessor 42, all connected by a data bus 44.

The turbo dial button 32, which is manually operated in this embodiment, sends a signal when pressed to the slave microprocessor 42 which in turn sends an interrupt signal to the master microprocessor 40. The slave microprocessor 42 enables the telephone user to communicate with the master microprocessor 40 and transceiver 38. The slave microprocessor 42 is coupled to the display 30 and the turbo dial button 32. The turbo dial button 32 enables the user to automatically dial a central voice-activated dialing system, answer incoming phone calls, terminate phone calls and power the phone up or down.

The master microprocessor 40 controls the basic functions of the cellular telephone 10 such as providing power up or power down in response to a turbo dial indication, calling the central voice-activated dialing system in response to the turbo dial signal, as well as answering incoming phone calls. The number for the central voice-activated dialing system is contained in memory 46, and a power controller 48 controls power to the electronics.

The transceiver 38 transmits and receives cellular telephone communications. The transceiver 38 is coupled to a microphone 50 disposed in the mouthpiece 26 of the telephone housing 12. Communications from the user are received by the microphone 50 and then transmitted by the transceiver 38 over cellular telephone communication channels. The transceiver 38 is also coupled to a speaker 52 housed in the earpiece 28 of the phone housing 12. The transceiver 38 receives cellular telephone communications from cellular telephone channels and communicates the transmissions to the user via the speaker 52.

It should be understood that the components of the electronic package used in the cellular telephone 10 may vary. For example, it may be desirable to use a single microprocessor rather than the combination of the master microprocessor 40 and the slave microprocessor 42.

Although not illustrated, the cellular telephone 10 also includes an antenna embedded in the housing 12. It should be understood, however, that the antenna could be in the form of a mast antenna extending from the housing 12.

The design of the cellular telephone 10 allows the user to automatically contact a central voice-activated dialing system remote from the user by simply pressing the turbo dial button 32 which shifts the telephone from the first condition to the second condition. As described above, the turbo dial button 32 is also functional to answer incoming phone calls. The cellular telephone 10 does not include a keypad and, because the turbo dial button 32 provides contact with a remote central voice-activated dialing system, no keypad is necessary to make telephone calls provided that the central voice-activated dialing system is accessible from the user's location. Without a keypad, the cellular telephone 10 does not need as much surface area as a conventional cellular telephone and can be made very slender and compact.

Figure 3:
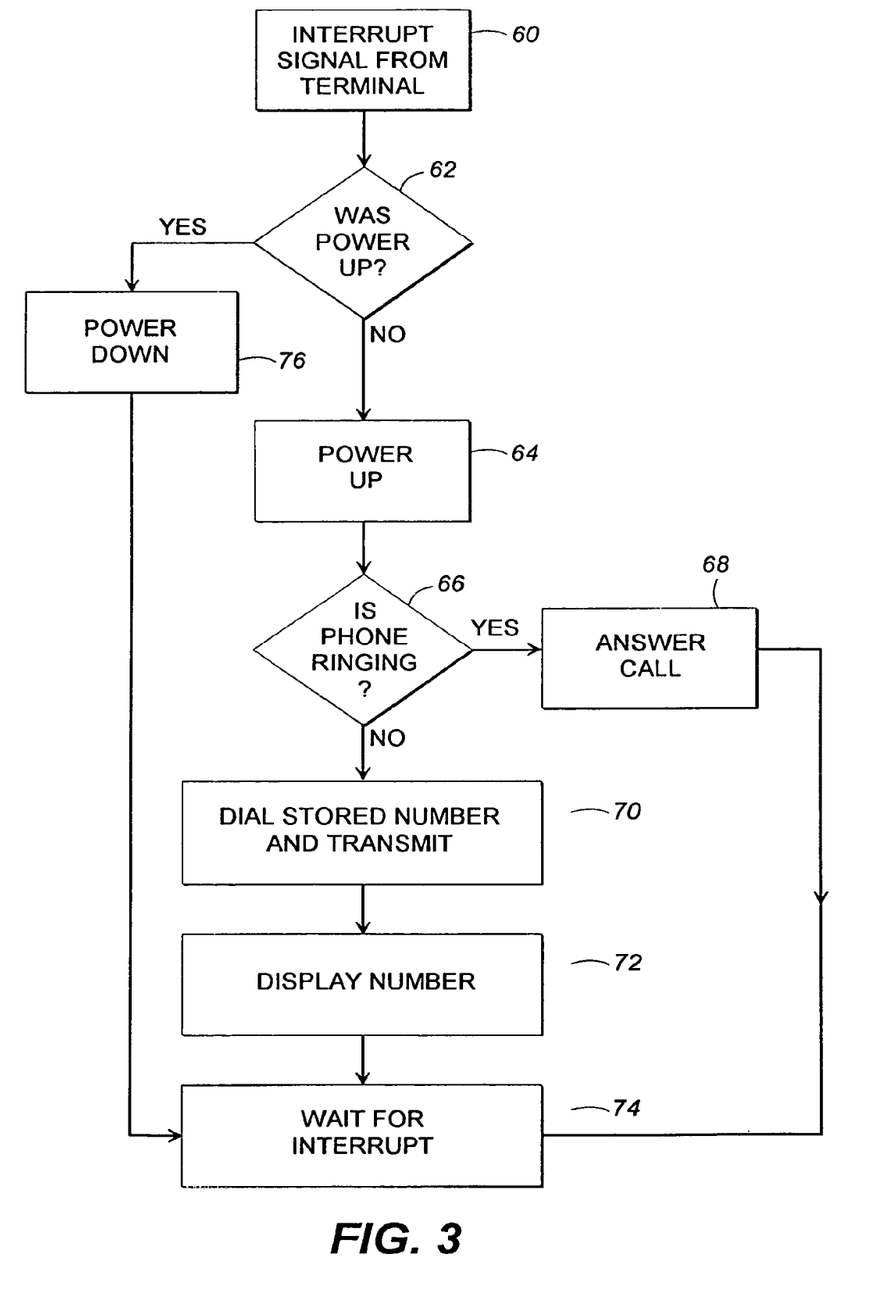
FIG. 3 is a block diagram of the function of the microprocessor used in the telephone shown in FIG. 1.

The flow chart on FIG. 3 illustrates the function of the cellular telephone 10. When it is desired to answer an incoming call or make a phone call, the turbo dial button 32 is pressed to send an interrupt signal to the slave microprocessor 42 at 60 of the block diagram in FIG. 3. The master microprocessor 40 inquires as to whether the phone 10 is powered up at 62. If the phone is not powered up, the master microprocessor signals the power controller 48 to power up at 64. The master microprocessor 40 then inquires at 66 as to whether the phone 10 is ringing. If the phone is ringing, the call is automatically answered at 68. If the phone is not ringing, the master microprocessor 40 automatically dials the stored number for the remote central voice-activated dialing system at 70, displays the number being called at 72 through the slave microprocessor 42, and then waits at 74 for another interrupt signal from the turbo dial button 32. If the master microprocessor 40 determines at 62 that the phone 10 is already powered up, the master microprocessor signals the power controller 48 to power down at 76, and the phone 10 then waits for a further interrupt signal from the turbo dial button 32. Powering down automatically terminates any ongoing phone call.

Figure 4:
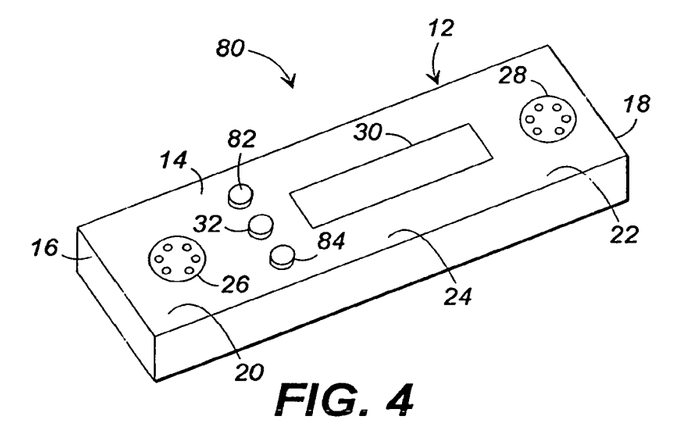
FIG. 4 is a perspective view of a portable cellular telephone made according to another embodiment of the present invention comprising multiple turbo dial buttons.

Another portable cellular telephone 80 made according to an embodiment of the present invention is 35 shown in FIG. 4 and has the same structure and function as the portable cellular telephone 10 illustrated in FIG. 1 except that this embodiment includes additional turbo dial buttons 82 and 84. The cellular telephone 80 is programmable such that the additional, turbo dial buttons 82 and 84 function to call any desirable number such as the user's home and business numbers.

Figure 5:
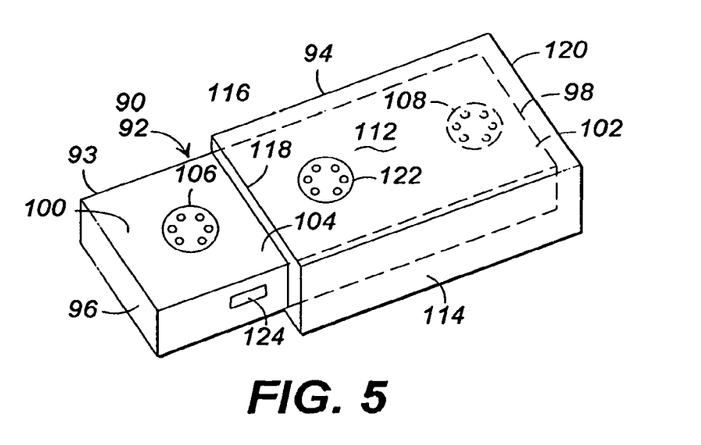
FIG. 5 is a perspective view of a portable cellular telephone made according to still another embodiment of the present invention including a slide cover.
Figure 6:
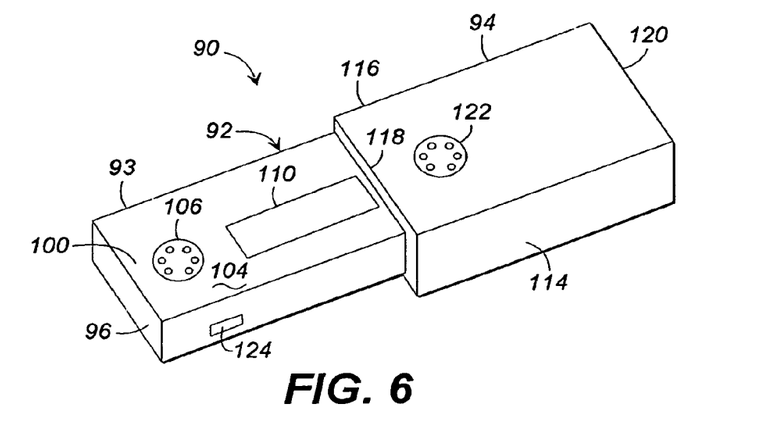
FIG. 6 is a perspective view of the portable cellular telephone shown in FIG. 5 with the cover in the second position.

A portable cellular telephone 90 made according to still another embodiment of the present invention is illustrated in FIGS. 5 and 6 and generally comprises a housing 92 which includes a base portion 93 and a reciprocable slide cover 94 which can be shifted relative to the base portion.

The cover 94 is selectively reciprocable relative to the base portion 93 between a first position, illustrated in FIG. 5, wherein the cellular telephone 90 is in the first condition, and alternatively, a second position, illustrated in FIG. 6 wherein the cellular telephone 90 is in the second condition. The first and second conditions of the cellular telephone 90 are the same as for the cellular telephone 10 described above and illustrated in FIG. 1. In the second condition, the cover 94 is extended from the base portion 93 and either an incoming phone call is answered or a remote central voice-activated dialing system is called automatically. Calls can be automatically terminated by shifting the cover 94 from the second position, wherein the telephone is in the second condition, to the first position, wherein the telephone is in the first condition. The telephone 90 automatically powers up when the cover 94 is shifted from the first position to the second position and automatically powers down when the cover is shifted from the second position to the first position.

The base portion 93 of the housing 92 is desirably made of injection-molded plastic and has a length extending along a longitudinal axis from a bottom end 96 to a top end 98. The base portion 93 includes a mouthpiece portion 100 at the bottom end 96 and an earpiece portion 102 at the top end 98. The base portion 93 of the housing 92 includes a central portion 104 between the mouthpiece portion 100 and the earpiece portion 102. The base portion 93 of the housing 92 includes a mouthpiece 106 at the mouthpiece portion 100 and an earpiece 108 at the earpiece portion 102. In addition, the base portion 93 of the housing 92 includes a display 110 like the display 30 of the embodiment shown in FIG. 1. The display 110 is located along the central portion 104 of the housing base 93.

The cover 94 is also desirably made of injection-molded plastic and includes a central panel 112 and a pair of opposing L-shaped side walls 114 and 116 which give the cover 94 a tray shape. The base portion 93 of the housing 92 slides matingly between the side walls 114 and 116 of the cover 94. The cover 94 extends from a lower end 118, which faces the bottom end 96 of the housing base 93, to an upper end 120, which extends above and beyond the top end 98 of the housing base. The cover 94 reciprocates over the earpiece portion 102 of the housing base 93 along the length of the telephone 90.

The cover 94 also includes an antenna (not shown) embedded therein; however, it should be understood that the antenna could also be a mast antenna attached to either the cover 94 or the base portion 93 of the housing 92. The cover 94 also includes a plurality of holes 122 for releasing sound from the earpiece 108 through the cover.

The cover 94 can be shifted from the first position, wherein the lower end 118 of the cover is positioned proximate the mouthpiece 106 and the cover is unextended, to the second position, wherein the lower end of the cover is proximate the earpiece 108 and the cover is in the extended position, by pressing a release button 124 on the housing base 93. A suitable release mechanism and antenna arrangement is disclosed in U.S. patent application Ser. No. 08/705,426, filed on Aug. 29, 1996, the disclosure of which is expressly incorporated herein by reference in its entirety.

The portable telephone 90 illustrated in FIGS. 5 and 6 can utilize the same electronic package as described for the embodiment illustrated in FIG. 1. Likewise, the cellular telephone 90 shown in FIGS. 5 and 6 functions in the same manner as the embodiment shown in FIG. 1 and in accordance with the block diagram in FIG. 3. Instead of a push button turbo dial switch, however, the cellular telephone 90 illustrated in FIGS. 5 and 6 automatically produces a turbo dial signal when the cover 94 is shifted from the first position to the second position upon pressing the release button 124. A magnetically activated switch (not shown) such as a reed switch or a hall-effect switch is disposed in the housing 92 and functions as a turbo dial switch when the cover 94 is reciprocated between the first and second positions. The cellular telephone 90 is in the first condition when the cover 94 is in the first position and is in the second condition when the cover 94 is in the second position.

Accordingly, when it is desirable to make a phone call using the cellular telephone 90, the release button 124 is pressed and the cover 94 is automatically shifted from the first position to the second position and a remote, central voice-activated dialing system is called. The user then recites the desired number into the mouthpiece 106 and the call is automatically made by the voice-activated dialing system. When termination of the call is desired, the cover 94 is simply shifted from the second position to the first or closed position. Incoming calls can be answered by pressing the release button to shift the cover 94 from the first position to the second position. The phone 90 is automatically powered up when the cover 94 is shifted from the first position to the second position and automatically powered down when the cover is shifted from the second position to the first position.

Figure 7:
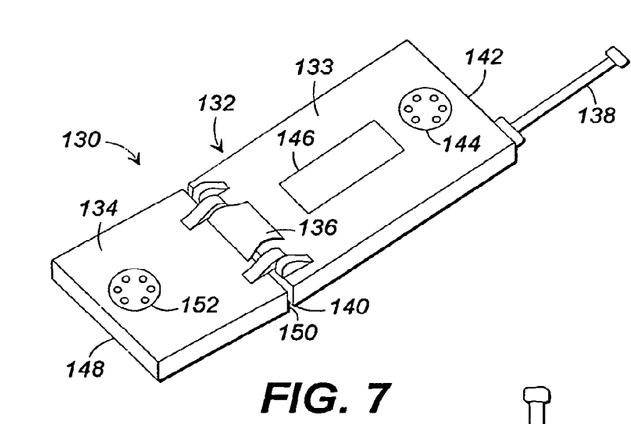
FIG. 7 is a perspective view of a portable cellular telephone made according to yet another embodiment of the present invention comprising a flip cover.
Figure 8:
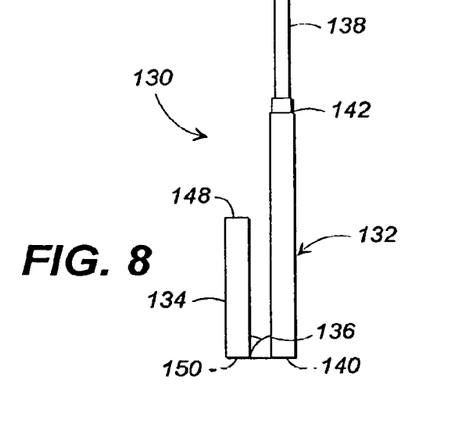
FIG. 8 is a perspective view of the portable cellular telephone shown in FIG. 7. The phone in FIG. 8 is shown with the flip cover closed in the first position.

A portable cellular telephone 130 made according to yet another embodiment of the present invention is illustrated in FIGS. 7 and 8 and generally comprises a housing 132 including a base portion 133 and flip cover 134 connected to the base portion with a hinge 136. The cellular telephone 130 also includes a mast antenna 138 extending upwardly from the base portion 133 of the housing 132.

The base portion 133 of the housing 132 extends from a bottom end 140 to a top end 142 and is substantially prismatic in shape. The base portion 133 also includes an earpiece 144 proximate the top end 142 and a display 146 between the earpiece and the bottom end 140. The mast antenna 138 extends upwardly from the top end 142 of the base portion 133. The hinge 136 is positioned at the bottom end 140 of the base portion 133.

The flip cover 134 is also substantially prismatic in shape and extends from a bottom end 148 to a top end 150 and is connected at the top end to the bottom end 140 of the base portion 133 with the hinge 136. The flip cover 134 has a mouthpiece 152 disposed near the bottom end 148 of the flip cover.

The flip cover 134 is rotatable about the hinge 136 relative to the base portion 133 between a first position wherein the cellular telephone 130 is in the first condition and a second position wherein the cellular telephone is in the second condition. When the cellular telephone 130 is in the first condition, the flip cover 134 is positioned against the base portion 133 so that the mouthpiece 152 is against the base portion. When the cellular telephone 130 is in the second condition, the flip cover 34 is turned downwardly and away from the base portion 133 so that the cellular telephone is extended.

The portable telephone 130 illustrated in FIGS. 7 and 8 contains the same electronic package as the cellular telephone illustrated in FIG. 1 and that electronic package functions in the same manner as illustrated in FIG. 3 except that the turbo dial signal is generated by a switch activated by shifting the flip cover 134 between the first and second positions. A suitable structure for the flip cover 134 and hinge 136 mechanism is described in U.S. Pat. No. 5,195,759, the disclosure of which is expressly incorporated herein by reference in its entirety.

To make or answer a phone call using the cellular telephone 130, the user flips the flip cover 134 from the first position to the second position and an incoming call is automatically answered, or if there is no incoming call, a remote central voice-activated dialing system is dialed. When making a call, once the connection is made with the voice-activated dialing system, the user simply recites the number to be called and the call is made. To terminate a call or power down the cellular telephone 130, the user flips the flip cover 134 from the second position to the upright first position.

It should be understood that the foregoing relates to particular embodiments to the present invention, and that numerous changes may be made therein without departing from the scope of the invention as defined by the following claims.

What is claimed is:

1. A cellular telephone device for connecting to a remote voice-activated dialing system, the cellular telephone device comprising:
   a housing comprising a mouthpiece portion, an earpiece portion, a base portion, and a lighted display, the housing not containing a keypad;
   a transceiver and a processor contained within the housing; and
   a memory contained within the housing, the memory storing a telephone number for the remote voice-activated dialing system and storing instructions and that, when executed by the processor, cause the processor to perform operations comprising
      powering up the cellular telephone device, wherein powering up the cellular telephone device is in response to a cover of the cellular telephone device being shifted from a first position to a second position,
      when the cellular telephone device is powered up, communicating with the remote voice-activated dialing system via the telephone number for the remote voice-activated dialing system stored on the memory for initiating an outgoing call,
      displaying, via the lighted display, the telephone number for the remote voice-activated dialing system, and
      terminating the outgoing call in response to the cover of the cellular telephone device being shifted from the second position to the first position.

2. The cellular telephone device of claim 1, wherein the lighted display indicates a home telephone number when the home telephone number is called.

3. The cellular telephone device of claim 1, wherein the lighted display indicates one of an on status and an off status of the cellular telephone device.

4. The cellular telephone device of claim 1, wherein the lighted display indicates one of a roam status and a home status.

5. The cellular telephone device of claim 1, further comprising a turbo dial button.

6. The cellular telephone device of claim 5, wherein the turbo dial button is programmable.

7. The cellular telephone device of claim 5, wherein the turbo dial button is a manual push button.

8. The cellular telephone device of claim 5, wherein the turbo dial button is a magnetically activated switch.

9. The cellular telephone device of claim 1, wherein the cover is a shifting cover that is reciprocable between the first position and the second position, and wherein when the shifting cover is in the first position, the cellular telephone device powers down and when the shifting cover is in the second position, the cellular telephone device powers up.

10. The cellular telephone device of claim 1, wherein the earpiece portion is on the cover and the mouthpiece portion is on the base portion.

11. The cellular telephone device of claim 1, wherein the cellular telephone device is powered up when the cover and the base portion are in an open position, and wherein the second position is the open position.

12. The cellular telephone device of claim 1, wherein the cover is a flip cover that is rotatable about a hinge connected to the base portion.

13. A method of connecting to a remote voice-activated dialing system, the method comprising:
  powering up, by a processor of a cellular telephone device, the cellular telephone device, wherein powering up the cellular telephone device is in response to a cover of the cellular telephone device being shifted from a first position to a second position;
  reading, by the processor automatically upon powering up the cellular telephone device, a telephone number associated with the remote voice-activated dialing system from a memory of the cellular telephone device;
  using, by the processor, the telephone number to connect to the remote voice-activated dialing system for initiating an outgoing call;
  displaying, by the processor via a display of the cellular telephone device, the telephone number; and
  terminating, by the processor, the outgoing call in response to the cover of the cellular telephone device being shifted from the second position to the first position.

14. The method of claim 13, further comprising receiving an activation of a turbo dial button.

15. The method of claim 14, wherein the activation of the turbo dial button causes the cellular telephone device to dial a further telephone number stored in the memory.

16. The method of claim 14, wherein the turbo dial button is activated to answer an incoming call.

17. The method of claim 13, wherein the cellular telephone device further comprises an earpiece portion and a mouthpiece portion.

18. The method of claim 17, wherein the cellular telephone device further comprises a base portion and wherein the earpiece portion is on the cover and the mouthpiece portion is on the base portion.

19. The method of claim 18, wherein the cellular telephone device is powered up when the cover and the base portion are in an open position, and wherein the second position is the open position.

20. The method of claim 13, wherein the cellular telephone device further comprises a base portion and wherein the cover is a flip cover that is rotatable about a hinge connected to the base portion.

* * * * *